United States Patent [19]

Kanegae

[11] 4,354,239
[45] Oct. 12, 1982

[54] FUEL INJECTION CONTROL SYSTEM FOR AN INTERNAL COMBUSTION ENGINE

[75] Inventor: Hidetoshi Kanegae, Yokohama, Japan

[73] Assignee: Nissan Motor Company, Limited, Yokohama, Japan

[21] Appl. No.: 129,729

[22] Filed: Mar. 12, 1980

[30] Foreign Application Priority Data

Mar. 15, 1979 [JP] Japan .................................. 54-29386

[51] Int. Cl.³ ........................ F02M 51/00; F02B 3/04; F02D 5/02
[52] U.S. Cl. ............................. 364/431.05; 123/486; 123/487; 364/569
[58] Field of Search ...................... 364/431, 426, 569; 123/480, 486, 478

[56] References Cited

U.S. PATENT DOCUMENTS

| | | | |
|---|---|---|---|
| 4,199,812 | 4/1980 | Klötzner et al. | 364/431 |
| 4,200,063 | 4/1980 | Bowler | 123/478 |
| 4,204,256 | 5/1980 | Klötzner | 364/431 |
| 4,224,910 | 9/1980 | O'Brien | 123/489 |
| 4,229,793 | 10/1980 | Yoshida et al. | 364/431 |
| 4,259,723 | 3/1981 | Fujisawa et al. | 364/426 |

FOREIGN PATENT DOCUMENTS 2742763 11/1978 Fed. Rep. of Germany ...... 364/431

*Primary Examiner*—Felix D. Gruber
*Attorney, Agent, or Firm*—Schwartz, Jeffery, Schwaab, Mack, Blumenthal & Koch

[57] ABSTRACT

A fuel injection valve of an internal combustion engine is opened at a predetermined crank angle position. A counter starts to count pulses from a clock pulse signal generator at the predetermined crank angle position, and produces a signal to close the fuel injection valve when the accumulated count in the counter reaches an integer value which corresponds to the ratio of Ti to Tc where Ti is the fuel injection time duration, calculated by a calculating means from engine operational parameters, and Tc is the period of the signal from the clock pulse signal generator. The clock pulse signal generator is controlled by the calculating means, and the period Tc of its output signal is thereby varied. The ratio of Ti to Tc should preferably be selected so as to be as close to the capacity of the counter as possible. A voltage controlled oscillator may be used as the clock pulse signal generator, together with a digital to analog converter which converts the fuel injection time interval Ti to a voltage value which is inputted to the voltage controlled oscillator so as to control its output frequency.

6 Claims, 4 Drawing Figures

FUEL INJECTION CONTROL SYSTEM FOR AN INTERNAL COMBUSTION ENGINE

BACKGROUND OF THE INVENTION

This invention relates to an electronic fuel injection control system for an internal combustion engine, and more particularly to a digital fuel injection control system which calculates a fuel injection time interval according to a predetermined program, based on operating parameters of the engine, and opens and closes a fuel injection valve in accordance with the results of this calculation.

Conventionally, analog operational circuits have been mainly used as fuel injection control systems. However, the recent wide use of microcomputers has brought the development of fuel injection control systems which use digital data processing. In these systems, basically, a fuel injection pulse width is calculated according to a program, using data representing the rate of air intake to the engine, the degree of vacuum within the air intake system, and the rotational speed of the engine. The resultant pulse width is corrected according to sensed values of water temperature, etc., and is fed to a register in an output device, which counts pulses of a clock signal and outputs a control pulse having a width corresponding to the content of the register to drive the control fuel injection valve.

One example of a prior art digital fuel injection system incorporating a control device such as described above is shown in FIG. 1 of the accompanying drawings. This system, generally designated by reference numeral 10, includes a microcomputer 12 which comprises a central processor unit (CPU) 14, a random access memory (RAM) 16, and a read only memory (ROM) 18. This type of microcomputer is well known and further description thereof is omitted. An input interface 20 is connected through a data bus 22 and an address bus 24 to the microcomputer 12 and converts input signals from various sensors such as, for example, a sensor 26 which senses the flow rate of intake air to the engine, a cooling-water temperature sensor 28, and a rotational speed sensor 30, to corresponding digital signals, by an analog to digital converter, not shown, comprised therein, and feeds these digital signals to the microcomputer.

An output interface 32 comprises an output register 34 connected through the bus lines 22 and 24 to the microcomputer 12, a clock pulse generator 36, a fuel injection counter 38, a flip-flop 40, and a power transistor 42. A crank position sensor 44 produces a signal at a certain angular position during each rotation of the engine crank shaft 46, and supplies this signal to the flip-flop 40 in order to determine the instant for starting fuel injection. The flip-flop 40 controls the fuel injection valve 48 through the power transistor 42.

In operation, the analog outputs of the sensors 26, 28 and 30 are converted in the input interface 20 to corresponding digital values which are supplied to the microcomputer 12. The microcomputer 12 carries out arithmetic operations on the data input thereto according to a stored program, to obtain a digital value corresponding to the desired fuel injection pulse width, this value being loaded into the output register 34. These operations are carried out on an ongoing basis, irrespective of the angular position of the crank shaft.

The fuel injection counter 38 starts to count by responding to the signal from the crank position sensor 44, and continues to count clock pulses from the clock pulse generator 36 for so long as the counted value in the counter 38 is smaller than the value in the output register 34. When the counted value in the counter 38 reaches the value set therein by the output register 34, or when the value in the output register 34 is updated so that it becomes smaller than the count in the counter 38, the counter 38 stops counting, and resets the flip-flop 40. This flip-flop outputs a fuel injection signal when set, and is set by the signal from the crank position sensor 44 and reset by the output of the counter 38, so that, via transistor 42, it, as explained above, controls the fuel injection valve 48.

In this system, the value in the output register 34 is very often updated, and, particularly, is updated after the injection of fuel. On the other hand, the period of the clock pulse from the generator 36 is constant. Generally, the width of an injection pulse required by the engine is substantially from a minimum of 0.5 ms to a maximum of 150 ms. The number of bits available in the output register 34 and the injection counter 38 is limited. Therefore difficulty arises with regard to the precision available therein. For example, when the capacities of the output register 34 and the counter 38 are both 10 bits, the maximum value for the count is 1023. If the period of clock pulses is selected so that the maximum fuel injection pulse width of 150 msec corresponds to the maximum count of 1023, then this clock pulse period will be 150/1023=0.147, that is, about 0.15 msec (150 $\mu$s). However, a unit minimum step change of 0.15 ms in injection pulse duration, corresponding to one clock pulse period, in the vicinity of the minimum injection pulse duration of 0.5 msec will lead to poor accuracy of control of injection pulse duration, bringing about a maximum possible error of ±15% in the duration. On the other hand, increase in the counter capacity makes the system expensive.

SUMMARY OF THE PRESENT INVENTION

Therefore, it is an object of the present invention to provide a fuel injection control system which provides excellent control of the fuel injection time, whether a relatively long or short injection duration is required.

Another object of the present invention is to provide a fuel injection control system of the above type which is of a relatively simple structure.

BRIEF DESCRIPTION OF THE DRAWINGS

Other objects, features and advantages of the present invention will become more apparent from the following description taken in conjunction with the accompanying drawings, which show the operation of an embodiment, for purposes of illustration only. In the drawings.

DETAILED DESCRIPTION OF THE PREFERRED EMBODIMENT

Figure 1:
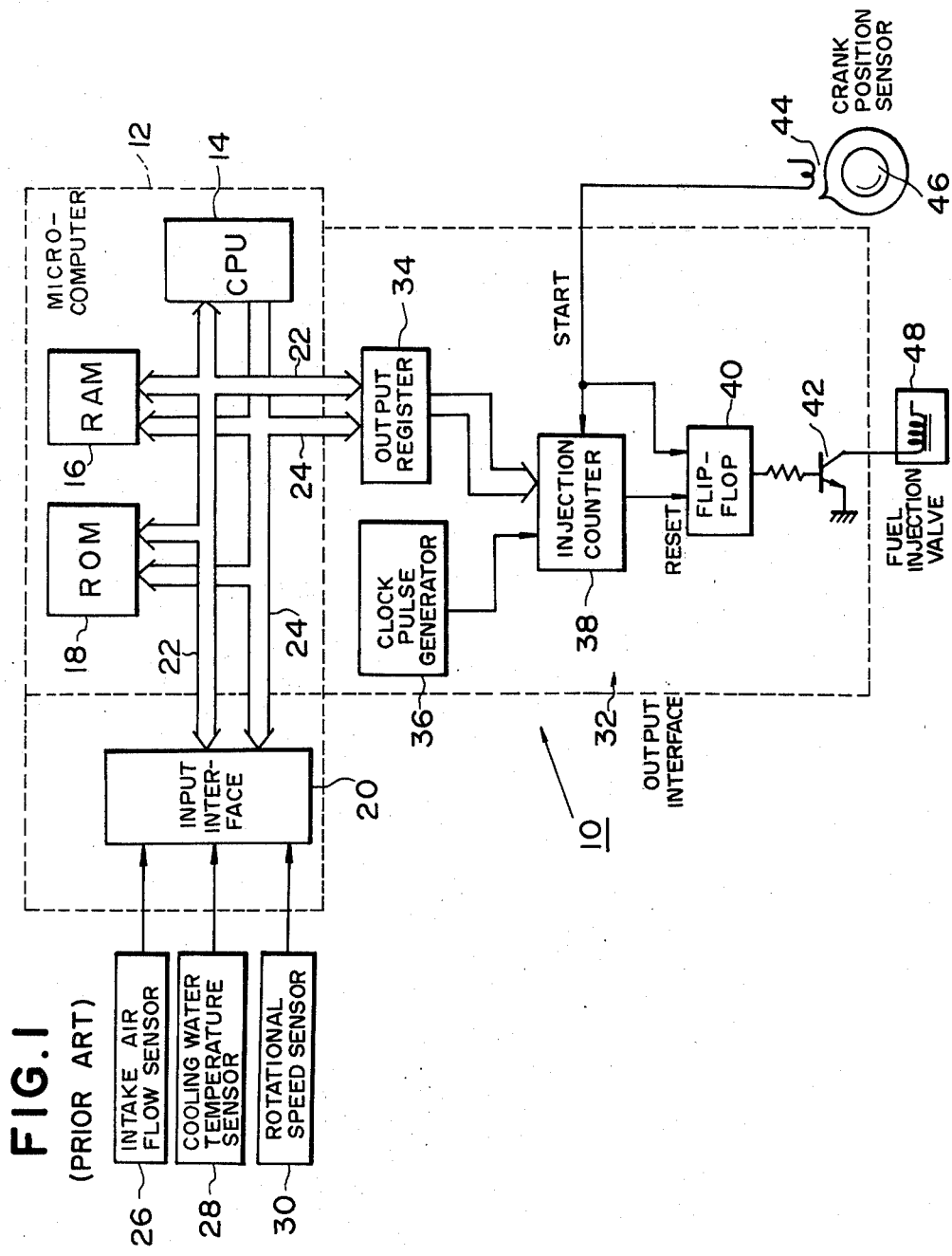
FIG. 1 is a block diagram of a conventional fuel injection control system.
Figure 2:
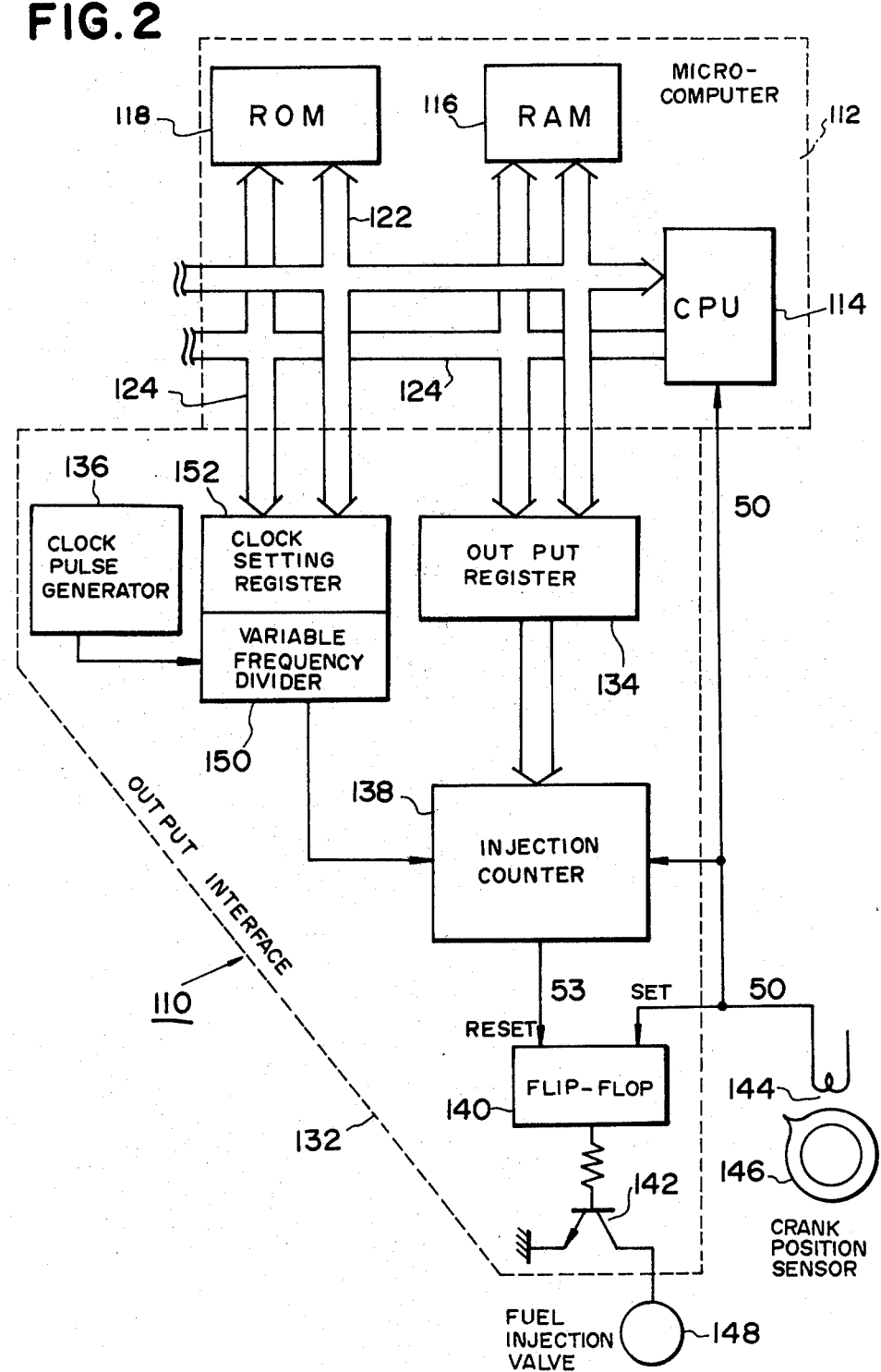
FIG. 2 is a block diagram of a fuel injection control system according to the present invention.

Referring to FIG. 2, one embodiment of the fuel injection control system of the present invention is shown. An input interface for this device is substantially the same as that shown by 20 in FIG. 1, and description thereof is omitted for the sake of brevity. A microcomputer 112 is composed of a central processor unit (CPU) 114, a random access memory (RAM) 116, and a read only memory (ROM) 118, as in the device in FIG. 1. An output register 134, an injection counter 138 and a flip-flop 140 of an output interface 132 have substantially the same structures as the corresponding elements, in FIG. 1. In this particular embodiment, the output interface 132 includes a clock switching circuit which is a variable frequency divider 150. This divider divides a reference frequency produced by a clock pulse generator 136, according to the value set in a clock setting register 152, and outputs a modified clock signal, of the desired reduced frequency and increased period, to the injection counter 138. The register 152 is set through a data bus 122 and an address bus 124 from the CPU 112. TABLE I shows an example in which a reference clock signal of 1 1 MHz is divided, using a 3-bit clock setting register 152.

TABLE I

| VALUE IN CLOCK SETTING REGISTER | DIVIDING RATIO | MODULATED CLOCK SIGNAL PERIOD |
|---|---|---|
| 000 | 8 | 8 μs |
| 001 | 16 | 16 μs |
| 010 | 32 | 32 μs |
| 011 | 64 | 64 μs |
| 100 | 128 | 128 μs |
| 101 | 256 | 256 μs |

Figure 3:
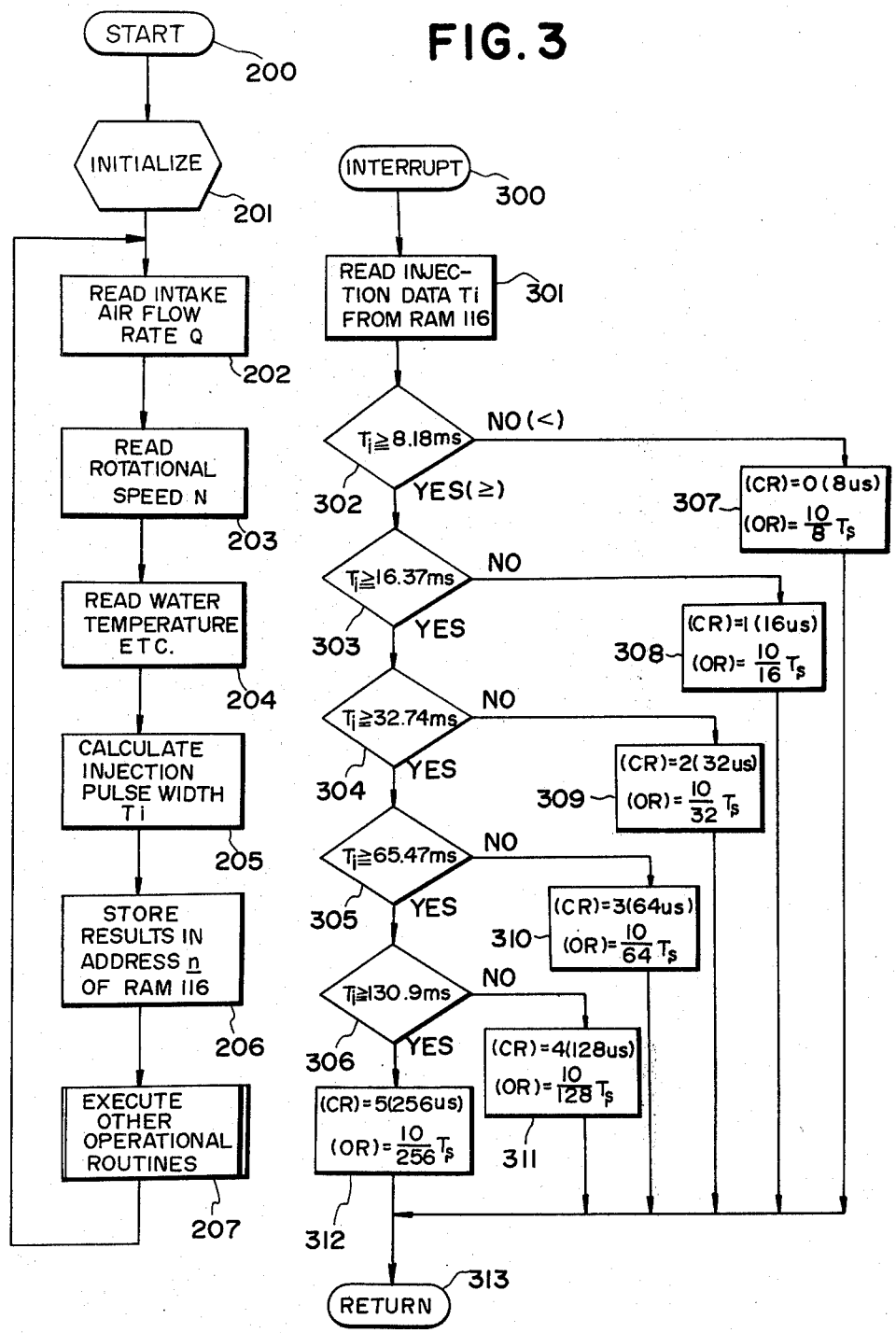
FIG. 3 is a flowchart of the operation of the system of FIG. 2.

As shown in the flowchart of FIG. 3, the microcomputer 112 starts at the step 200 and is initialized at 201. The signal inputs from the input sensors such as shown by 26, 28 and 30 in FIG. 1 are sent to an input interface such as shown by 20 in FIG. 1 and are digitized therein. These digitized signals are inputted to the microcomputer 112. These steps are shown as reading the flow rate of intake air, the number of rotations of the crank per unit time, and the cooling water temperature by 202, 203 and 204, respectively. Other parameters of engine operation could of course be used. The duration Ti of the desired fuel injection pulse is calculated from the above data, in box 205, and stored in a predetermined address, for example n, of the RAM 116 in the form of a binary number expressed in units of 10 msec, as shown by 206. This calculation could, for example, be according to the equation $Ti = K \cdot Q/N \cdot C_1 + C_2$ where Q is the flow rate of intake air into the engine, N is the engine speed K is a constant which determines the fuel to air ratio, $C_1$ is a correcting factor which is determined by the water temperature, etc., and $C_2$ is a correcting value which is determined by the voltage of the battery, etc. The microcomputer 112 repeats the above-mentioned and other operations such as, for example, control of the rate of exhaust gas recirculation, control of the timing of the ignition, etc., as shown by 207, and updates the data in the RAM 116 repeatedly, on an ongoing basis.

Figure 4:
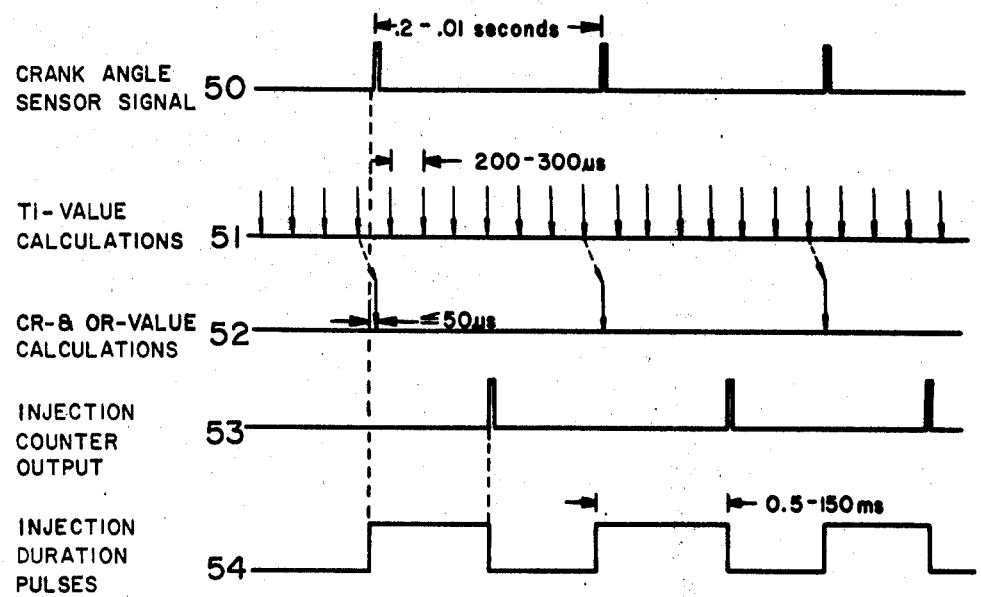
FIG. 4 is a time chart for pulses produced by the system of FIG. 2.

The signal 50 from the crank position sensor 144 sets the flip-flop 140, instructs the injection counter 138 to start counting, and acts as an interrupt request signal to the microcomputer 112, as shown in FIG. 4. Upon receiving the interrupt signal, the microcomputer 112 temporarily stops the operations which are being carried out and executes an interrupt processing program, as shown by 300. In this interrupt processing program, first, the value Ti showing the desired fuel injection pulse duration stored in the RAM 116, is read into the CPU 114, as shown by 301, then a clock pulse dividing ratio is selected which gives a highest possible control accuracy, according to the value of Ti, and the the value Ti is converted to an appropriate value corresponding to the selected clock pulse period, said value being set in the output register 134 and the injection counter 138.

The interrupt program of FIG. 3 is an example in which the output register 134 and the injection counter 138 have each a capacity of 10 bits, and the clock setting register 152 can select any one of the frequency dividing ratios, i.e. clock periods, given in Table I.

As shown in FIG. 3, the injection pulse duration Ti is sequentially checked in five successive steps 302 to 306, so as to discriminate whether Ti is larger or smaller than 8.18, 16.37, 32.74, 65.47 or 130.9 ms. After the pulse duration is finally sorted by these respective steps, 302 to 306, a value (CR) and a value (OR) are set in the clock setting register 152 and the output register 134, respectively. When the pulse duration Ti is smaller than 8.18 ms, the (CR) of the register 152 is zero, i.e. the dividing ratio is 8 and the modified clock signal period is 8 μs while the (OR) of the output register 134 is Ti/Tc (where Tc is the period of the modified clock signal) = 10/8·Ts. Here, Ts represents a value of four digits converted from the calculated fuel injection pulse duration Ti. In the same way, when the pulse duration Ti is between 8.18 m and 16.37 ms, (CR) = 1 (16 μs) and (OR) = 10/16·Ts, as shown by 307. When the pulse duration Ti is between 16.37 ms and 32.74 ms, (CR) = 2(32 μs) and (OR) = 10/32·Ts, as shown by 309. When the pulse duration Ti is between 32.74 ms and 65.47 ms, (CR) = 3(64 μs) and (OR) = 10/64·Ts, as shown by 310. When the pulse duration Ti is between 65.47 ms and 130.9 ms, (CR) = 4(128 μs) and (OR) = 10/128·Ts, as shown by 311. When the pulse duration is larger than 130.9 ms, (CR) = 3(256 μs) and (OR) = 10/256·Ts, as shown by 312. The (CR) is shown in binary code in TABLE I, while it is shown in decimal code in FIG. 3.

As shown in FIG. 3, if the output register 134 and the injection counter 138 each have a capacity of 10 bits, and the maximum pulse duration Ti is 150 ms, the maximum (CR) of the clock setting register 152 is 5 (256 μs), as shown by 312, in order that the content of the counter 138 does not exceed the maximum of 1023. If, for example, the required injection pulse duration Ti is 1230 (12.3 ms), then (CR) = 1(16 μs) and (OR) = 10/16·Ts, as shown by the sequential blocks 303 to 308 in FIG. 3. That is, 1(i.e. 001) is set in the clock setting register 152 so as to produce a modified clock pulse signal having a period of 16 μs while the value 10/16 × 1,230 = 768.75→769 is set in the output register 134. Use should be made of a modified clock pulse signal having as short a period as possible, within the limiting value of 1023 of the output register 134, so as to control fuel injection with high accuracy. After running, the interrupt processing routine ends and returns control to the normal operational processing routine, as shown by 313.

Referring to FIG. 4, the timings of the above operations and processing routines are shown. The CPU 114 repeats the arithmetic operation of calculating the requried injection pulse duration Ti, as shown by 51, thereby updating the value stored in the RAM 116. According to the output signal 50 from the crank position sensor 144, an interrupt operation is carried out, as shown in FIG. 3, to set a (CR) value and an (OR) value in the registers 152 and 134, as shown by 52. The value of Ti adopted at this time is the newest one obtained by the operations of the CPU 114. The injection counter 138 effects a counting operation to produce an output 53 when the accumulated count reaches the set value in the counter. The output 53 lowers the fuel injection controlling output 54 of the flip-flop 140, which has been high from the time when the flip-flop 140 has received the signal 50.

The particular embodiment shown in FIG. 2 uses a variable frequency divider 150 as a clock switching circuit. However, a device which outputs a signal having a continuously changeable period, such as a voltage controlled oscillator, may be used as a clock signal modification circuit, so as to maintain a constant preset count in the injection counter, irrespective of the actual magnitude of the desired injection pulse duration, or, alternatively, so as to change the preset count in the injection counter in a multi-step mode. When such a voltage controlled oscillator is used, of course, a digital to analog converter should be used at the stage directly preceding the oscillator. This enables selection of an optimal modified clock signal, and consequent improvement of the control process.

In the block diagram showed in FIG. 2, the start of counting by the injection counter 138 and the setting of the flip-flop 140 is shown as directly commanded by the crank position signal. Thus, during the time from the start of counting of the setting of a new value in the clock setting register 152, the clock pulses appropriate for the previous injection cycle may be counted, which forms a cause of possible errors. In order to remove this problem, the start of counting by the injection counter 138 and the setting of the flip-flop 140 is acutally, in this embodiment, effected after the switching of the clock and the setting of the data have ended, by an instruction from the CPU 114 of the computer 112.

When a microcomputer is used to practice the present invention, it is also often used to control the timing of ignition. In this case, since ignition is effected for each cylinder, the crank position signal should be outputted at a position corresponding to the top dead center point of each cylinder. For example, in the case of a 6-cylinder 4-cycle engine, three positional signals are outputted for each rotation of the crank shaft. In order to use such positional signals to cuse fuel injection once for each rotation, the output register should be set once every three interruptions to start the injection counter, for example.

Although the present invention has been shown and described with reference to a particular embodiment thereof, and with reference to the illustrative drawings, it should not be conceived of as limited thereto; various alterations, omissions, and modifications to the form and the content of any particular embodiment could be made therein, without departing from the spirit of the invention, or from its scope; and it is therefore desired that this scope should be defined not by any particular features of the shown embodiment (which is given, as were the drawings, for the purposes of elucidation only), but solely by the accompanying claims.

What is claimed is:

1. A fuel injection control system for an internal combustion engine with a fuel injection valve, the system including a microcomputer which calculates a value of fuel injection time duration Ti based on detected operating parameters of the engine including crank angle position, said system comprising:
    (a) means for generating a first injection signal to open said injection valve in response to a detected predetermined crank angle position;
    (b) means for producing clock pulse signals having a period Tc, said period Tc being a small fraction of the fuel injection time duration Ti;
    (c) a counter;
    (d) said microcomputer including a CPU, a data memory storage for storing data and a program memory storage for storing a control program for controlling said calculation and causing said CPU to
        (i) compare the calculated value Ti with a plurality of limit values to determine one of a plurality of ranges for Ti, each range having an upper limit value of Ti,
        (ii) generate a set value signal (OR) indicative of the calculated value of Ti,
        (iii) generate a clock control signal (CR) corresponding to said determined range for Ti, said clock control signal indicative of said clock period, Tc, wherein for each of said ranges of Ti, the ratio of the upper limit value of Ti to the value Tc is approximately equal to the largest count value within the capacity of said counter;
    (e) said clock pulse signal producing means including means responsive to said clock control signal for adjusting the period Tc of said clock pulse signals in dependence upon said clock control signal;
    (f) said counter connected to receive said clock pulse signals for counting same and connected to receive said set value signal (OR) for setting said counter to said set value indicative of said calculated value Ti;
    (g) said counter operative to start counting said clock pulse signals upon opening of said fuel injection value and generating a second injection signal when the number of counted clock pulse signals reaches said set value, and
    (h) means responsive to said second injection signal for closing said injection valve.

2. The fuel injection control system of claim 1, wherein said period adjusting means comprises a clock setting register connected to receive said clock control signal and a variable frequency divider responsive to said clock setting register to adjust the period Tc of said clock pulse signals by an amount indicated by said clock control signal.

3. The fuel injection control system of claim 1 or 2, wherein said injection valve closing means comprises a flip-flop connected to receive said second injection signal, said flip-flop connected in an electrical circuit for controlling closing of same.

4. The fuel injection control system of claim 1, wherein said clock pulse signal producing means comprises a digital-to-analog converter connected to receive said clock control signal and a voltage-controlled oscillator responsive to said digital-to-analog converter to produce clock pulse signals of period Tc adjusted in accordance with the voltage output by said converter.

5. A method for controlling fuel injection in an internal combustion engine of the type having a fuel injection valve, a counter, and a microcomputer which calculates a value of fuel injection duration Ti based on detected operating parameters of the engine including crank angle position comprising the steps of:

(a) generating a first injection signal to open said injection valve in response to a detected predetermined crank angle position;

(b) producing clock pulse signals having a period Tc, said period Tc being a small fraction of the fuel injection duration Ti;

(c) comparing the calculated value of Ti with a plurality of limit ranges to determine one of a plurality of ranges for Ti, each range having an upper limit value of Ti;

(d) generating a set value signal (OR) indicative of the calculated value of Ti;

(e) generating a clock control signal (CR) corresponding to said determined range for Ti, said clock control signal indicative of said clock period Tc, wherein for each of said ranges of Ti, the ratio of the upper limit value of Ti to the value of Tc is approximately equal to the largest count value within the capacity of said counter;

(f) adjusting the period Tc of said clock pulse signals in dependence upon said clock control signal;

(g) setting said counter to said set value indicating of said calculated value of Ti;

(h) counting said clock pulse signals in said counter, starting synchronously with the opening of said injection valve;

(i) generating a second injection signal when the clock pulse signal count at least equals said set value; and (j) closing said injection valve in response to said second injection signal.

6. The fuel injection control method of claim 5, wherein said adjusting step (f) comprises the step of multiplying the period Tc of said clock pulse signals by a value in accordance with said clock control signal.

* * * * *